3,239,648
APPARATUS FOR ARC WELDING
Simon E. Syrigos, Maplewood, Mo., assignor, by mesne assignments, to Harnischfeger Corporation, West Milwaukee, Wis., a corporation of Wisconsin
Filed Oct. 1, 1963, Ser. No. 312,959
4 Claims. (Cl. 219—130)

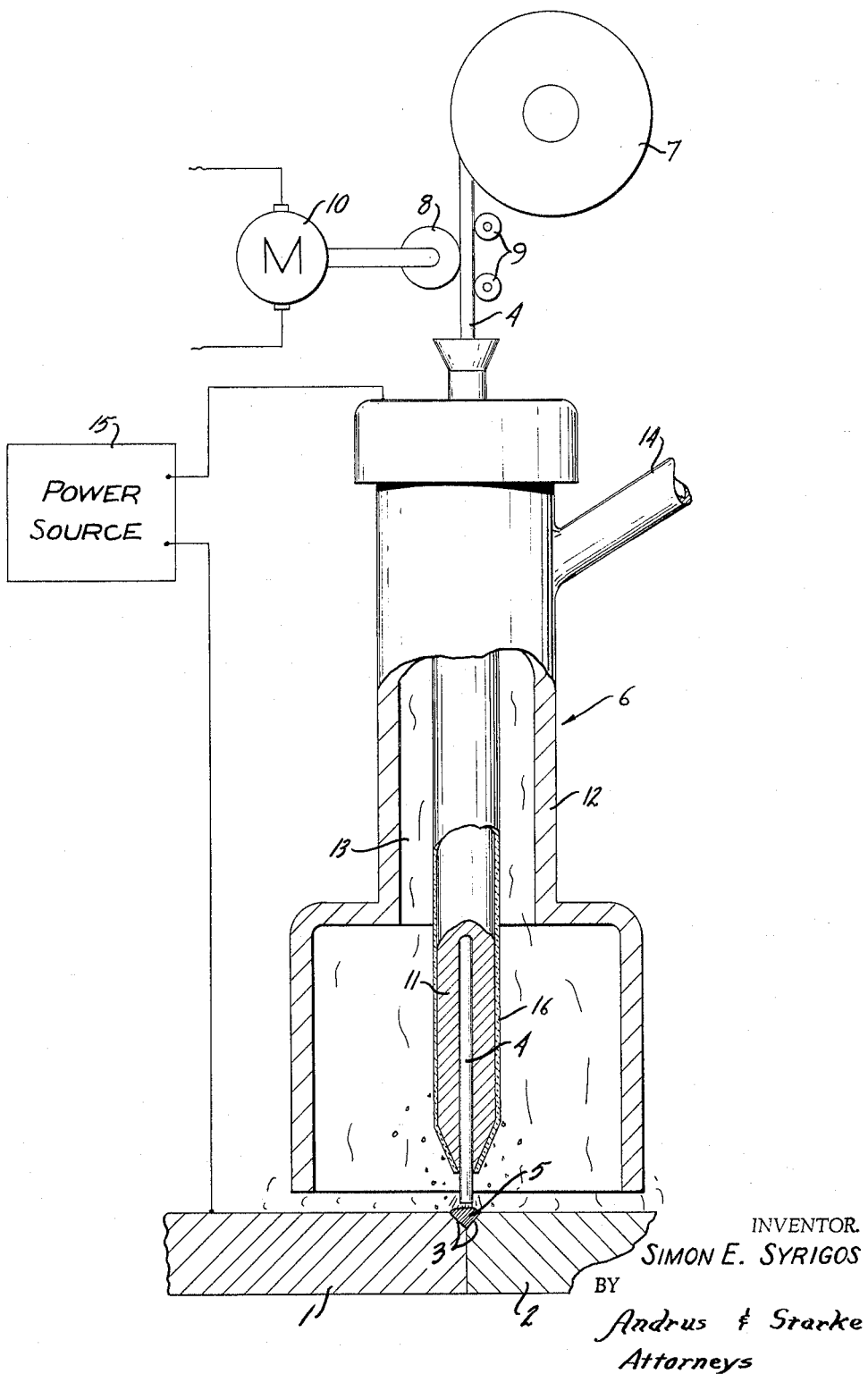

This invention relates to an apparatus for welding and more particularly to an improved contact tube structure for use in a consumable electrode welding apparatus.

In the conventional consumable electrode welding process the electrode is contained on a reel and fed through a contact tube toward the workpiece. The contact tube provides electrical connection between the source of power and the electrode. An arc is established between the end of the electrode and the workpiece, and the electrode is fed toward the workpiece at a rate corresponding to the rate of burnoff of the electrode. The arc is usually shielded from the surrounding air by a shielding gas which is fed to the area of the arc through a nozzle or barrel. The nozzle surrounds the contact tube, and the shielding gas is introduced into the annular space between the contact tube and the nozzle and flows toward the arc.

During the welding process, and particularly where carbon dioxide shielding gas is used, the explosive arc characteristics cause molten metal droplets to be projected from the arc and adhere to the walls of the contact tube and the nozzle.

This weld spatter is most pronounced when the electrode is connected in a direct current electrical circuit in which the electrode is the negative pole, or cathode, referred to as straight polarity arc welding. After a period of welding, the weld spatter may accumulate to an extent that the spatter will bridge between the nozzle and the contact tube with the result that the arc will short out. This means that the contact must be removed and replaced.

The present invention eliminates the problem of shorting out of the arc by an accumulation of weld spatter by applying a coating of a high temperature refractory material to the outer surface of the contact tube. The refractory coating serves to electrically insulate the contact tube, and even though the weld spatter may build up and bridge the gap between the nozzle and the contact tube, the arc will not short out.

The drawing is a diagrammatic view of a welding process using the contact tube of the invention.

Referring to the drawing, a pair of workpieces 1 and 2 are disposed in abutting relation with a welding V-groove 3 formed in the upper surface of the workpieces. An arc is struck between the end of a consumable electrode 4 and the base of the V-groove 3, and the end of the electrode is burned off or melted to provide a molten weld puddle 5.

The electrode 4 is contained in coiled form on a reel 6 and continuously fed through a welding head 7 to the arc. A frictional drive roll 8 cooperates with idler rolls 9 to engage the electrode 4 and the roll 8 is driven by a motor 10 to continuously feed the electrode 4 to the welding head 7.

The welding head 7 includes a contact tube 11 which is concentrically mounted with an outer nozzle 12. The nozzle 12 is spaced outwardly from the contact tube 11 to provide an annular passage 13 through which a shielding gas is directed to the arc. The shielding gas is introduced into the passage 13 through a conduit 14 connected to a suitable source of shielding gas, not shown. The shielding gas to be used can be any conventional shielding gas, such as argon, helium, carbon dioxide, carbon monoxide and the like.

The contact tube 11 and the workpiece 1 are connected to a suitable source of power 15 to establish and maintain an arc between the electrode 4 and the workpieces 1 and 2.

During the welding operation, small droplets or globs of weld metal may spray upwardly from the arc and this weld spatter will adhere to the inner wall of the nozzle 12, as well as the outer surface of the contact tube 11. Eventually, the accumulation of weld spatter will bridge over between the nozzle and the contact tube to short out the arc. According to the invention, the outer surface of the contact tube 11 is provided with a coating or layer of a high temperature refractory material 16. The refractory coating 16 is an electrically insulating material and even though the weld spatter may accumulate and bridge over between the nozzle 12 and the contact tube, the arc will not short out because of the insulating coating 16.

The refractory material can be any high temperature, electrically insulating material which will retain its physical characteristics at temperatures generally above 2500° F. The refractory material can be selected from oxides or nitrides of aluminum, magnesium, zirconium, boron, silicon, hafnium, chromium, titanium, beryllium, molybdenum, lanthanum, niobium, tantalum, tungsten, or vanadium; borides of aluminum, magnesium, zirconium, silicon, hafnium, chromium, titanium, beryllium, molybdenum, lanthanum, niobium, tantalum, tungsten, or vanadium; silicides of aluminum, magnesium, zirconium, boron, hafnium, chromium, titanium, beryllium, molybdenum, lanthanum, niobium, tantalum, tungsten, or vanadium; zirconates of aluminum, magnesium, silicon, boron, hafnium, chromium, titanium, beryllium, molybdenum, lanthanum, niobium, tantalum, tungsten, vanadium; or the like. It has been found that aluminum oxide and zirconium oxide are readily available materials, will not melt or decompose when subjected to the high temperatures developed at the arc, and provide a very satisfactory coating 16.

The thickness of the refractory coating 16 is not critical, for the coating only serves to electrically insulate the contact tube, and any thickness which will provide this insulating effect is satisfactory.

The refractory coating is preferably applied to the outer surface of the contact tube 11 by a high temperature plasma arc coating process. In the conventional plasma arc coating process, high temperatures in the neighborhood of 30,000° F. are developed, and the powdered refractory material is fed to the arc and impinged against the outer surface of the contact tube. Due to these high temperatures, there is some fusion of the refractory material and the resulting coating is a dense, adherent, dull textured layer on the outer surface of the contact tube. It may be desired to surround the contact tube 11 with an inert gas, such as argon, during the plasma arc coating process to prevent excessive oxidation of the refractory material.

As the coating 16 is a high temperature refractory material having a melting point of over 2500° F., the coating will not deteriorate or decompose by the temperature developed at the arc. The welding spatter will stick to the coating 16 as well as to the inner surface of the nozzle 12. However, even if the welding spatter accumulates to an extent so that it bridges the gap between the nozzle 12 and the contact tube, the arc will not short out due to the insulating nature of the coating 16.

The use of the refractory coating 16 on the contact tube increases the length of service of the contact tube and enables the contact tube to be used for substantially longer periods without removing the weld spatter. This reduces maintenance costs and lowers the overall cost of welding.

Various modes of carrying out the invention are contemplated as being within the scope of the following claims particularly pointing out and distinctly claiming the subject matter which is regarded as the invention.

I claim:
1. In an apparatus for welding, a consumable electrode, a contact tube having an opening to receive the electrode, means for feeding the electrode through the contact tube toward a workpiece, means for establishing an arc between the electrode and the workpiece, a metallic nozzle disposed around the contact tube and spaced outwardly from said tube to provide an annular passage therebetween, means for introducing a shielding gas into said passage and directing said gas to the arc to shield the same, and a layer of a high temperature refractory material covering the outer surface of the contact tube, said layer of refractory material preventing the arc from shorting out in the event weld spatter bridges the passage between the nozzle and the contact tube.

2. The structure of claim 1 in which the refractory material will retain its physical characteristics at temperatures above 2500° F.

3. In an apparatus for arc welding using a consumable electrode, a contact tube having an opening through which the electrode is fed, a metallic nozzle surrounding the contact tube and spaced outwardly therefrom to provide an annular passage therebetween for the flow of a shielding gas to the arc, and a layer of an electrically insulating refractory material applied to the outer surface of the contact tube as a continuous dense layer, said refractory material having a melting point above the temperature developed at the arc and serving to prevent the arc from shorting out in the event weld spatter bridges the passage between the nozzle and the contact tube.

4. In an apparatus for welding, a consumable electrode, a contact tube having an opening to receive the electrode and having a tapered discharge end located adjacent the workpiece, means for feeding the electrode through the contact tube toward said workpiece, means for establishing an arc between the electrode and a workpiece, a metallic nozzle disposed around the contact tube and spaced outwardly from said tube to provide an annular passage therebetween, means for introducing shielding gas into said passage, and a coating of a high temperature refractory material covering the outer surface of the contact tube and disposed over the tapered discharge end of said tube, said refractory material having a melting point above the temperature developed at the arc and serving to prevent the arc from shorting out in the event weld spatter bridges the passage between the nozzle and the contact tube.

References Cited by the Examiner

UNITED STATES PATENTS

| | | | |
|---|---|---|---|
| 2,736,787 | 2/1956 | Welch | 219—130 |
| 2,827,550 | 3/1958 | Unrath | 219—130 |
| 2,881,305 | 4/1959 | Wojciak et al. | 219—130 |
| 3,025,387 | 3/1962 | Kinney | 219—130 |
| 3,048,691 | 8/1962 | Longstreth | 219—130 |

RICHARD M. WOOD, *Primary Examiner.*